(12) United States Patent
George et al.

(10) Patent No.: US 8,078,714 B2
(45) Date of Patent: Dec. 13, 2011

(54) SYSTEM AND METHOD FOR MANAGING REGISTRATION OF SERVICES FOR AN ELECTRONIC DEVICE

(75) Inventors: Richard John George, Waterloo (CA); Jonathan Joshua Dearden, Guelph (CA); Alexander Shatsky, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 120 days.

(21) Appl. No.: 12/576,755

(22) Filed: Oct. 9, 2009

(65) Prior Publication Data

US 2011/0087791 A1  Apr. 14, 2011

(51) Int. Cl.
G06F 15/173 (2006.01)

(52) U.S. Cl. ........ 709/223; 709/224; 709/225; 709/226; 709/230

(58) Field of Classification Search .................. 709/223, 709/224, 225, 226, 230
See application file for complete search history.

(56) References Cited

U.S. PATENT DOCUMENTS

| | | | |
|---|---|---|---|
| 2002/0126626 A1 | 9/2002 | Singh et al. | |
| 2006/0256816 A1* | 11/2006 | Yarlagadda et al. | 370/466 |
| 2006/0259616 A1 | 11/2006 | Lester | |
| 2007/0121808 A1 | 5/2007 | Brunson et al. | |
| 2007/0153776 A1* | 7/2007 | Joseph et al. | 370/356 |
| 2007/0180485 A1* | 8/2007 | Dua | 725/114 |
| 2007/0281682 A1 | 12/2007 | Raju et al. | |
| 2008/0016100 A1 | 1/2008 | Boni et al. | |
| 2008/0056232 A1 | 3/2008 | Koon et al. | |
| 2008/0089503 A1* | 4/2008 | Crockett et al. | 379/201.03 |
| 2008/0163318 A1 | 7/2008 | Chen et al. | |
| 2008/0216167 A1 | 9/2008 | Imai et al. | |
| 2009/0003325 A1 | 1/2009 | Lee et al. | |
| 2009/0024601 A1 | 1/2009 | Zmolek | |

OTHER PUBLICATIONS

Extract of Presence Based Services Market, 2007-2011 Management Report. Jul. 2007. Insight Research in http://www.telecomsresearch.com.
Rosenberg, Jonathan et al. SIP Extensions for Presence. Internet Engineering Task Force Internet Draft. Mar. 2, 2001.
McNaughton, Allan. Using Intelligent Presence to Create Smarter Business Applications. May 22, 2008. Avaya Developer Showcase in http://www.devx.com.
Poptiq Website. Accessed Oct. 2009. http://poptiq.com.

* cited by examiner

Primary Examiner — Liangche A Wang
(74) Attorney, Agent, or Firm — McCarthy Tétrault LLP

(57) ABSTRACT

The present disclosure described herein relates to a device and method for managing access to a server. The method comprises: receiving a request from the device for access to servers in a network; generating and sending access requests to servers from an interface entity, where the access requests are produced from analyzing at least one capability of the device; monitoring for responses from the servers to the access requests; extracting access information from the responses; and generating and sending a response to the request for access to the device, the response including the access information from the responses from the servers.

20 Claims, 6 Drawing Sheets

SYSTEM AND METHOD FOR MANAGING REGISTRATION OF SERVICES FOR AN ELECTRONIC DEVICE

FIELD OF DISCLOSURE

The disclosure described herein relates to a system and method for managing registrations to services for an electronic device, such as an electronic communication device. In particular, the disclosure described herein relates to managing access communications for the device when it is initiating a signon request to a service provided by a server in a network.

BACKGROUND

As wireless communication devices are portable, they can connect and communicate with several different wireless communication networks as they roam. A wireless mobile communication device typically can access a plurality of different networks, such as voice and data networks.

In a given network, a series of servers may provide services, such as local private branch exchange (PBX) services and voice mail services. When a wireless device enters a network, a series of messages is generated and sent between the device and the various servers in the network. Such messages can comprise negotiations with one or more servers to allow access to their respective services. Such streams of negotiations can occupy many computational and communication processing cycles for the device and servers as connections are negotiated.

There is a need for a system and method which addresses deficiencies managing access to such servers.

BRIEF DESCRIPTION OF THE DRAWINGS

Embodiments of the present disclosure will now be described, by way of example only, with reference to the accompanying drawings, in which.

DETAILED DESCRIPTION OF AN EMBODIMENT

Figure 1:
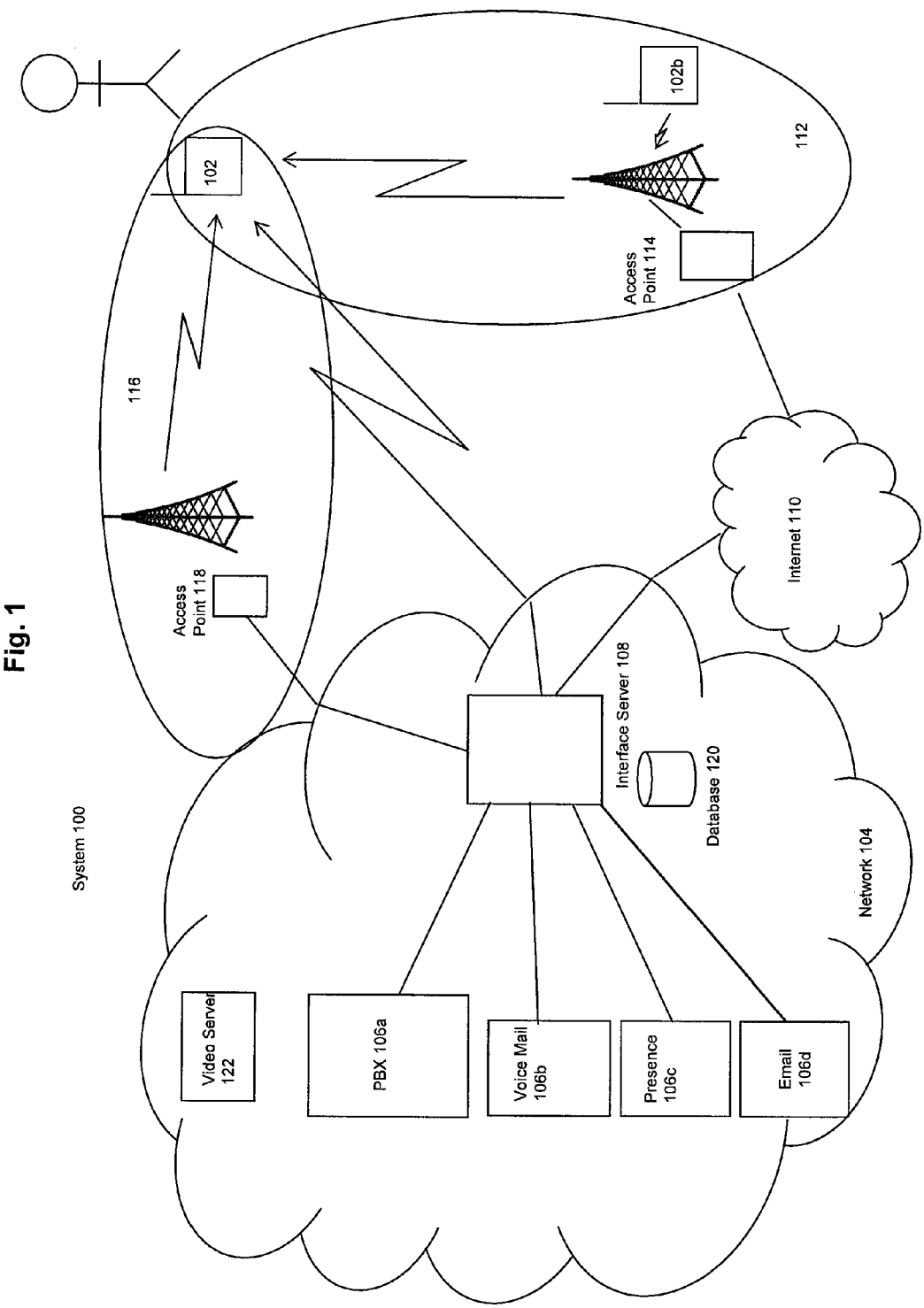
FIG. 1 is a schematic diagram of a device in communication with a communication network where the network provides services through a plurality of servers, accessed in part, by an interface server.

The description which follows and the embodiments described therein are provided by way of illustration of an example or examples of particular embodiments of the principles of the present disclosure. These examples are provided for the purposes of explanation and not limitation of those principles and of the present disclosure. In the description which follows, like parts are marked throughout the specification and the drawings with the same respective reference numerals.

In a first aspect, a method for managing access to a server in a network for a wireless electronic device through an interface server in the network is provided. The method comprises: after receiving at the interface server from the device a notification for access to one or more services or servers in the network, identifying one or more capabilities of the device, and analyzing the capabilities with operating parameters of the services or servers to identify a set of the services or servers that are compatible with the capabilities; sending a set of access requests from the interface server to a set of servers associated with the set of one or more services or servers; monitoring for responses from the set of servers to the set of access requests; and generating and sending a response to the device providing information relating to the responses from the set of servers.

In the method, the request from the device may be provided in a session initiation protocol (SIP) message; and the response to the request may be provided in another SIP message.

In the method, the response to the device may aggregate the information relating to the responses from the set of servers.

In the method, one or more capabilities of the device may be identified by analyzing data in the notification or other data.

In the method, the device may generate the notification when the device enters the network.

In the method, analyzing the capabilities with operating parameters of the services or servers may identify a server that was not included in the notification from the device.

The method may further comprise: receiving updated information regarding a capability of the device; at the interface entity, analyzing the updated information with operating parameters of the services or servers to identify a revised set of the services or servers that are compatible with the updated information; generating and sending a supplemental set of access requests to a second set of servers associated with the supplemental set of services or servers; monitoring for supplemental responses from the second set of servers to the supplemental set of access requests; and generating and sending a supplemental response to the device providing information relating to the supplemental responses from the second set of servers.

In the method, the updated information may be provided from a message received from the device.

In the method, data relating to the operating parameters of the services or servers may be provided to the interface server from a presence server in the network.

In the method, the interface server may provide network server information received from the presence server to the device.

In the method, one capability may be a voice communication capability and one of the servers may include a voice mail server.

In a second aspect, a method for managing access to a server in a network for an electronic device is provided. The method comprises: at the device, upon entry to the network identifying a set of servers in the network that can provide services to the device; at the device, generating and sending an access request for the set of servers to an interface entity in the network, the set of access requests produced from an analysis of a status of at least one capability of the device; and at the device, receiving a response to the access request from the interface server, the response including the access information from the set of servers.

In the method, the interface entity may: receive the access request and then generate and send a set of access requests to the set of servers; monitor for responses from the servers to the set of access requests; extract access information from the responses or requests; and generate and send the response to the request for access to the device.

In a third aspect, an interface server for managing access to a server in a network for an electronic device is provided. The interface server comprises: a connection to servers in the network; a communication link to the device; a microprocessor; a device communication module providing instructions to the microprocessor; an analysis module providing instructions to the microprocessor to identify a set of the servers to associate with the device after analyzing the one or more capabilities with operating parameters of the servers; and a server communication module providing instructions to the microprocessor. The server communication module sends a set of access requests from the interface server to the set of the servers; monitors for responses from the set of servers to the set of access requests; and generates and sends a response to the device providing information relating to the responses from the set of servers. The device communication module receive a request from the device for access to one or more of the servers and extract any data relating to one or more capabilities of the device from the request; and generates and sends a response to the request for access to the device.

In the server, data relating to the operating parameters of the one or more services or servers may be provided to the interface server from a presence server in the network.

The interface server may provide network server information received from the presence server to the device.

In other aspects, various combinations of sets and subsets of the above aspects are provided.

Generally, an embodiment provides a system and method to manage access to one or more services in a network for an electronic device, such as but not limited to a (handheld) wireless communication device. The services are provided through one or more servers logically connected to the network. Exemplary servers include a private branch exchange (PBX), a voice mail server, a Voice over IP (VoIP) gateway, presence server, and other application servers. An interface entity, such as an interface server, is provided in the network as an intermediary for the device and the servers to manage subscriptions and registrations for the device that are provided by the servers. In being an intermediary, the interface server can receive subscription requests from the electronic device intended for the servers and can forward them to the identified servers; the interface server also can receive replies from the servers, aggregate them and provide one or more responses to the device. A notable feature is the aggregation of messaging sent to disparate services on behalf of particular wireless device(s).

In one embodiment, an application or module provided in software, firmware or hardware is provided on the device or on an interface server in a network. Additionally, the application and module can be provided in both the device and the server. The module can track an environment and operating conditions on the device based on an analysis of data stored by and signals received by the device. The environment and operating conditions may include data relating to the time of day, the location of the device, the communication links currently established with the device, etc. The current environment and operating conditions of the device can be periodically evaluated against a set of predefined trigger conditions which relate to a set of applications or services provided in the network. Upon the satisfaction of a trigger condition for a particular application provided in the network, then the device (and its underlying application) may be registered with a server in the network that is managing the application. The module control may control the initial registration of the device to the application, any subsequent re-registrations and any de-registrations. In addition, the module may obtain network presence information regarding servers in the network. This may be done at power up of the device or when the device enters the network. That presence information may be used as part of the evaluation of trigger conditions for applications by the module. Also, the device may provide a notification to the module when notable conditions change on the device. For example, a notification can be sent when the device gains or loses Wi-Fi signal coverage.

In processing communications among the device, the module and the servers, various network communication protocols may be used for communications within elements in the network for an embodiment. The embodiment uses Session Initiation Protocol (SIP), which is used in setting up and tearing down multimedia communication sessions. The SIP protocol is an application layer protocol in the OSI-architecture model. The SIP protocol is defined in IETF RFC 3261, incorporated herein by reference.

First, a description is provided on a network and an exemplary communication device that accesses servers in the network for voice and data services according to an embodiment. Thereafter, specific features of an embodiment are discussed.

For the network, referring to FIG. 1, system 100 shows device 102 in communication with network 104. Device 102 is a communication device having any of data and voice communication capabilities; it may be a multiple-mode device capable of voice, data and other types of communications. Device 102 may be a wireless handheld device, cell phone, smart phone, personal digital assistant (PDA), and/or computer (either desktop or portable) having a (wireless) network card, network adapter and/or network interface controller (NIC) installed therein.

Device 102 is shown as communicating with several networks, each of which may be implemented in any known network architecture topology. Exemplary networks are described below.

Network 104 provides a suite of applications, services and data to its connected devices (e.g., device 102) through its associated servers 106a, 106b, 106c (collectively "servers 106"). Devices (such as device 102) connect to network 104 through wireless connections or through an external connection through Internet 110.

Wireless network 112 provides another communication link for device 102 to network 104. Network 112 provides communications between device 102 and device 102b. Wireless network 112 may be a data-centric network, a voice-centric network, or a dual-mode network. In one embodiment, wireless network 112 is implemented as a Wi-Fi network generally following standards set by the IEEE LAN/MAN Standards Committee, known as IEEE 802, through its working group "11". The 802.11 standard defines media access control (MAC) and physical (PHY) layers in the Open Systems Interconnection (OSI) protocol model for WLAN. Wireless network 112 includes an antenna and supporting radio transmission equipment known to those skilled in the art. Access point (AP) 114 is shown in network 104 and in an embodiment AP 114 is an IEEE 802.11 radio receiver/transmitter (or transceiver) and functions as a bridge between network 112 and network 104.

Cellular network 116 provides device 102 with another communication network allowing it to communicate with network 104. The coverage area of network 116 may overlap with the coverage areas of network 112. Cellular network 116 provides voice and data services to devices 102. Data-centric technologies for cellular network 116 include the Mobitex (trademark) Radio Network ("Mobitex") and the DataTAC (trademark) Radio Network ("DataTAC"). Voice-centric technologies for cellular network 116 include Personal Communication Systems (PCS) networks like Global System for Mobile Communications (GSM) and Time Division Multiple Access (TDMA) systems. Certain networks provide multiple systems. For example, dual-mode wireless networks include Code Division Multiple Access (CDMA) networks, General Packet Radio Service (GPRS) networks, and so-called third-generation (3G) networks, such as Enhanced Data rates for Global Evolution (EDGE) and Universal Mobile Telecommunications Systems (UMTS). Other network communication technologies that may be employed include, for example, Ultra Mobile Broadband (UMB), Evolution-Data Optimized (EV-DO), and High Speed Packet Access (HSPA), etc. Access point 118 may provide an interface communication point between network 116 and network 104.

Now, further detail is provided on exemplary servers 106 in network 104. Each server may communicate directly with elements communicating within network 104 (such as device 102 and other servers 106).

Private Branch Exchange (PBX) server 106a provides a messaging client allowing device 102 to establish local voice and data transmissions within network 104 and with exterior devices and networks. PBX server 106a provides a connection with a PSTN (not shown) for routing incoming and outgoing voice calls for network 104 and its associated enterprise. On one side, PBX server 106a is connected to an external telephone system, such as the PSTN, via direct inward dialling (DID) trunks. In an embodiment, PBX server 106a may use ISDN signalling protocols for establishing and breaking circuit-switched connections through the PSTN and related signalling and communications.

Voice mail server 106b provides storage, retrieval and processing of voice mail data files which may be processed by PBX server 106a or a VoIP (Voice over Internet) system (not shown) associated with network 104. Voice mail server 106b may also notify the user when a voice mail message is left in his mailbox. The notification is known as MWI (Message Waiting Indication).

Presence server 106c provides storage and forwarding of presence information of a device, such as device 102, to other devices and/or servers in network 104. Presence server 106c provides a platform that gathers presence information from multiple service providers in network 104 and selectively distributes the presence information among such providers and other applications operating in network 104.

Email server 106d provides storage, retrieval and processing of emails, SMS, MMS and other data files which may be processed by network 104. Other servers 106d may be provided (e.g. video streaming servers, etc.).

With components of an exemplary network identified, further detail is provided on notable features of an embodiment. An embodiment manages how device 102 contacts and communicates with servers 106 in network 104. In particular, instead of device 102 making individual communication dialogs with a series of servers 106, an embodiment provides interface server 108 to handle communications between device 102 and servers 106 that are connected to interface server 108. Interface server 108 streamlines the communications that device 102 would have to generate, receive and process when compared with the total in manage, to reduce the total amount of communications processed by device 102 when communicating with servers 106 that are connected to interface server 108. Device 102 provides notification messages to server 108 indicating when a change in a capability of device 102 has occurred, for example, a change in a Wi-Fi connection for device 102. Interface server 108 analyzes this status information against trigger conditions for the servers 106 to identify a list of servers 106 that can be connected to device 102. Thereafter, interface server 108 operates as an interface for communications between device 102 and servers 106.

The streamlining may be effected by grouping messages together (either from or to device 102) to reduce the total amount of messages transmitted. This may reduce the amount of communications that device 102 needs to generate and send, thereby reducing communication traffic and conserving battery power for device 102.

Notably, providing interface server 108 assists in reducing the total amount of communications that device 102 would have to process when device 102 initiates service requests with servers 106. Service requests may be initiated when device 102 first come in contact with network 104 (at that time, device 102 likely would not have established a connection with any server 106 in network 104). As an alternative to sending initial connection requests to each server 106 in network 104, device 102 initiates a communication dialog with interface server 108 to request connections to servers 106 that are connected to interface server 108. Then, interface server 108 determines what servers 106 should be connected to device 102. This dialog may replace or supplement a series of individual connection request dialogs between device 102 and servers 106.

Other servers in network 104 may provide video streaming facilities, backup facilities, etc. For example video server 122 may be provided in network 104. It may accessed by device 102 separately from interface server 108.

Figure 2:
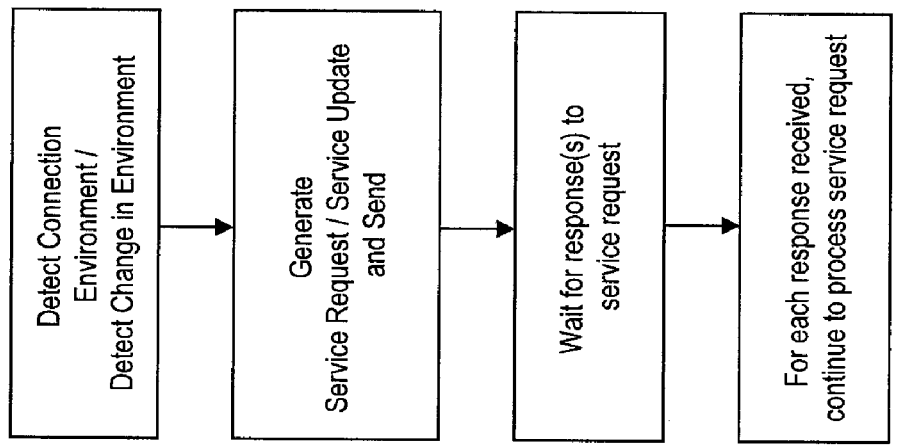
FIG. 2 is a flowchart of exemplary processes executed by the device of FIG. 1, when requesting a subscription to one or more servers through the interface server.
Figure 3:
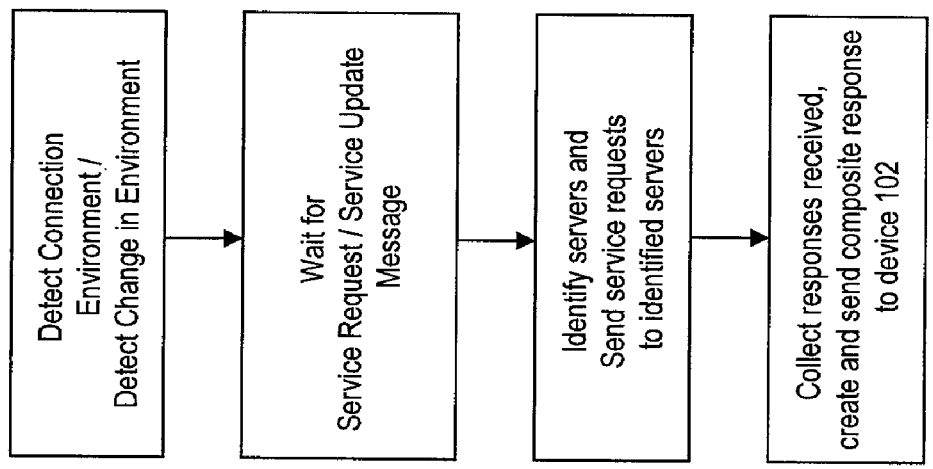
FIG. 3 is a flowchart of exemplary processes executed by the interface server of FIG. 1, when it receives a request from the device per FIG. 2.

Referring to FIGS. 2 and 3, when device 102 makes a request to interface server 108 for connections to servers 106 connected to interface server 108, a determination is made as to the current capabilities of device 102, which may include capabilities relating to available networks, processing capacities, storage capacities, power reserves of device 102 or other markers. This determination is based on any one or more of: status information that device 102 determines through a self-assessment; information that device 102 provides to interface server 108; status information of network 104; information that interface server 108 derives about device 102; status information of servers 106; and status information that server 108 requests of device 102, relating to the current operational capabilities of device 102.

In processing a subscription dialog for servers 106, either contemporaneously or shortly after receiving a request (e.g. upon entry to network 104), device 102 sends a request for such services to interface server 108. The request may include data relating to the capabilities of device 102. Data relating to capabilities of device 102 and services provided by servers 106 may be stored in database 120, accessible by interface server 108. Interface server 108 may then analyze the communication capabilities of device 102 against technical requirements of servers 106. From that analysis, server 108 can identify a list of servers 106 that device 102 can communicate with, based on the identified capabilities of device 102 and requirements of servers 106. As such, server 108 may utilize capability information of device 102 to register, re-register or subscribe to other servers 106 in network 104 on behalf of device 102. Once a set of servers 106 is identified as having services that are compatible with the identified capabilities of device 102, interface server 108 generates and sends a series of connection requests to each identified server 106 on behalf of device 102 (servers 106 that are not compatible with the capabilities of device 102 are not sent connection requests). Each server 106 then processes its received request and its local log-in module determines whether to grant access to device 102 and generates and sends a response back to server 108. As responses are provided by servers 106, an aggregate response is provided in one communication from interface server 108 to device 102. When device 102 receives the response, information regarding individual responses from servers 106 is extracted. Each individual response from a given server 106 is used to update how device 102 reacts to its original request for service from that server 106. Once a response is provided, device 102 may communicate with interface 108 and interface server 108 will communicate with servers 106 on behalf of device 102. In other embodiments, device 102 may also or alternatively communicate directly with server 106.

In one embodiment, a single connection request is sent from device 102 to interface server 108 and a single response regarding established connections is sent from server 106 to device 102. This provides a reduction in communications from a series of individual communications (e.g., connection requests from device 102 to server 108) between device 102 and each server 106 to a single "request and response" communication dialog between device 102 and interface server 108. In other embodiments, a single request from device 102 may be replaced with two or more requests. Preferably, the total number of request transmissions (and/or transmission bandwidth) is less than the total number of individual requests needed to contact each server 106. Also, in other embodiments, the single response from server 106 may be replaced with two or more responses. Again, preferably the total number of response transmissions is less than the total number of individual responses sent from all of the servers 106.

Interface server may utilize one of several triggers to determine when to send a response to device 102. Interface server 108 may wait until a certain number of responses are received from servers 106, or all responses are received, or a timer condition is met. Interface server 108 may not forward certain responses from a server 106 to device 102 if data in the responses has been deemed by server 108 to not be needed by device 102. However, additionally and/or alternatively, interface server 108 may send periodic messages to device 102, which include the responses it has received since its last message to device 102. Other dialogs may be provided for other events, such as a change in the capabilities of device 102, network 104 and/or servers 106.

Further detail is provided on an exemplary communication dialog among device 102, server 108 and servers 106 in an embodiment. Dialogs among device 102, server 108 and servers 106 may be implemented using messages following SIP protocols and messages to set-up, manage, and terminate sessions between device 102 and services provided by servers 106. SIP has been standardized and is governed primarily by the IETF as a protocol for setting up and managing sessions. Device 102 may be any hardware or software component that can terminate a communication session that could include, but is not limited to, a SIP session. Exemplary SIP messages include SUBSCRIBE, UNSUBSCRIBE, NOTIFY, RE-SUBSCRIBE, REGISTER, DE-REGISTER and RE-REGISTER. Further detail on aspects SIP messages are provided in the IETF publication "SIP-Specific Event Notification", RFC 3265, June 2002 and RFC 3261 "Session Initiation Protocol", incorporated herein by reference.

In other embodiments, a collection of protocols may be used among elements in network 104. There can be one protocol domain (SIP) between interface server 108 and other servers 106 and another protocol domain (non-SIP) between device 102 and interface server 108. For the purposes of illustration, an embodiment described herein is based on a network employing SIP messaging among all components. An embodiment may use a communication protocol other than SIP protocol.

Figure 4:
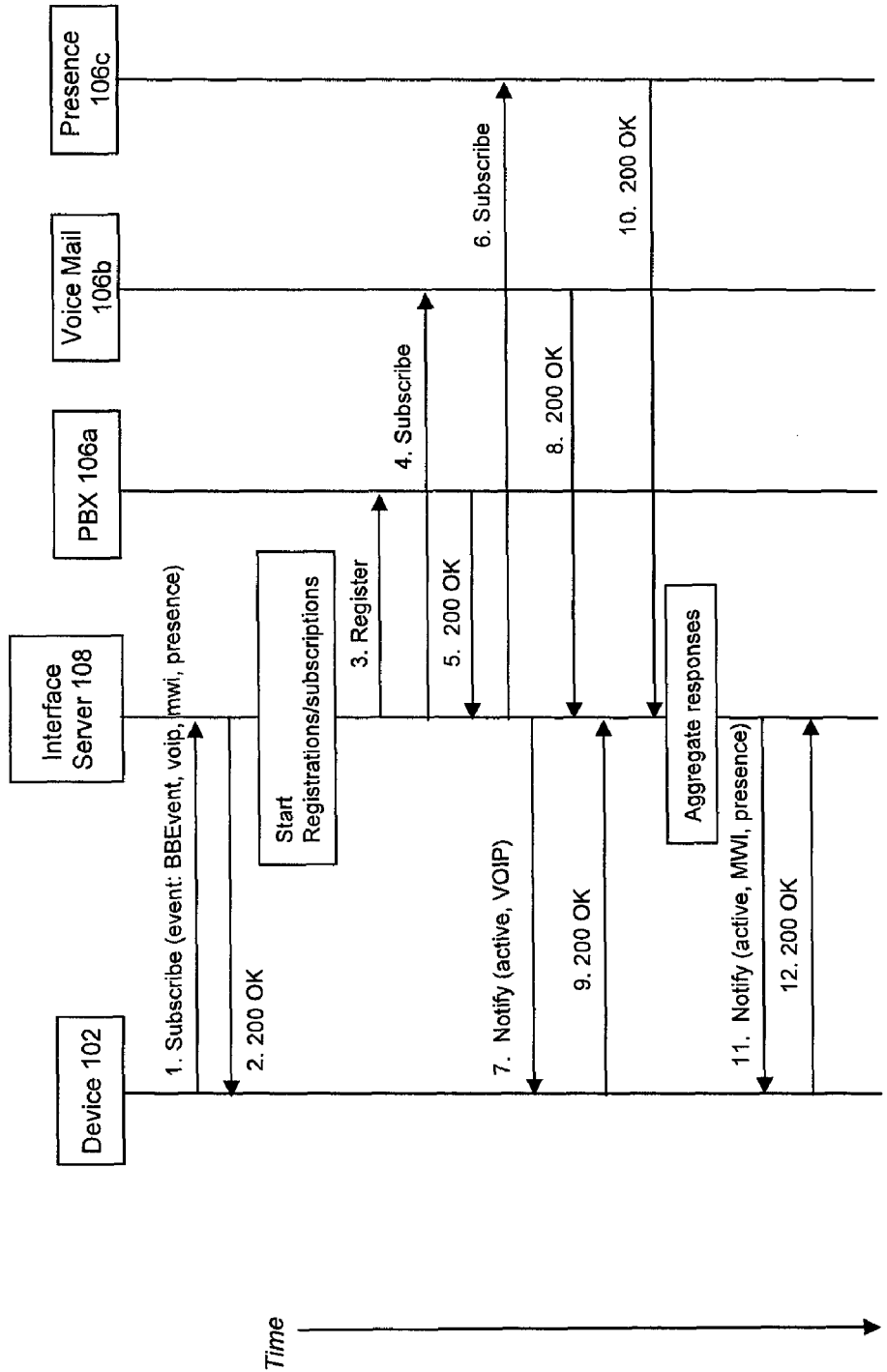
FIG. 4 is a message flowchart of exemplary messages generated by the device, interface server and servers of FIG. 1, when the device is requesting services from the servers.

Referring to FIG. 4, message flow diagram 400 shows an exemplary dialog between device 102 and interface server 108; and dialogs between interface server 108 and PBX 106*a*, voice mail server 106*b* and presence server 106*c*, such as when device 102 has entered network 104 and is initiating a subscription request for servers 106 through interface server 108.

For example, when device 102 enters network 104, device 102 may have completed an analysis of its current status and identified a list of potential services that match its capabilities to have from network 104. Using that list of potential services, device 102 sends a SUBSCRIBE message to interface server 108 indicating the services from which device 102 it is requesting services and/or a list of the capabilities of device 102. Exemplary services include, but are not limited to, VoIP, voice mail services and presence information from presence server 106*c*. Interface server 108 receives the SUBSCRIBE message and sends a "200 OK" message to device 102 to confirm that the subscription request has been received. This message does not confirm that any services have been provided to device 102.

Next, interface server 108 analyzes the contents of the SUBSCRIBE message, then identifies servers 106 that are: connected to interface server 108 and have services that are compatible with the capabilities of device 102. For each server 106 that has a service that is compatible with the information extracted from the SUBSCRIBE message, a separate REGISTER and/or SUBSCRIBE message is sent from interface server 108 to servers 106. See messages 3-5.

SUBSCRIBE messages may not be sent to every server 106 that can provide a service to device 102. For example, if it is determined that device 102 can communicate with a GPRS/EDGE network to provide a voice/data communication link, then providing a connection to VoIP server 106 in network 102 may be considered redundant in one embodiment. As such, even if device 102 provides a request for VoIP access in its SUBSCRIBE message, interface server 108 may not forward that request to the VoIP server. Alternatively, for example, if it is determined that device 102 can only communicate with the Wi-Fi/LTE network, then this may be a sufficient condition to initiate a connection request to VoIP server 106.

The SIP REGISTER request creates a binding between the addressing scheme of device 102 as expressed in the SIP URI of device 102 and one or more contact addresses specified in the SIP REGISTER request, namely the target server 106.

When interface server 108 provides a NOTIFY message to device 102, the message can indicate whether access to that service is allowed. For example, message 7 indicates to device 102 that VoIP service is active as a result of the "200 OK" message 5 sent from PBX server 106*a* to interface server 108.

Other message series, such as "500 Server Error", as specified in the SIP protocol may be used according to a particular situation. It will be appreciated that each message series will have its own expected send and reply message flow.

After each server 106 receives its REGISTER/SUBSCRIBE message, it may send a "200 OK" message to interface server 108 if its services are available. If the registration/subscription is not accepted by a particular server 106, that server 106 may reject the request or may request additional information, such as authentication information from interface server 108. Interface server 108 may reconstruct the request if the additional information is available and may resend a registration/subscription message; otherwise it may simply notify device 102 about the failure.

The status of a given server 106 may be any one or: active, terminated, unknown, or another state. An "active" state means that the server is active and that device 102 has the appropriate capabilities to use the services of the server. A "terminated" state indicates that the server has terminated its services for some reasons. Interface server 108 may need to take correction action(s) when this status is received, including resending REGISTER/SUBSCRIBE messages to the server 106 and notifying device 102. An "unknown" state indicates that the current state of capabilities of server 106 is unknown. The statue of a particular server 106 may be encoded in a "200 OK" message sent by the server 106 to interface server 108. In other embodiments, a different message may be sent (e.g. a message sent only on failure conditions) or no "OK" message may be sent.

As each "200 OK" is received by interface server 108 from each server 106, interface server 108 analyzes these messages for their source and content and builds a NOTIFY message for device 102 containing a list of servers 106 that are able to communicate with device 102. This would include any servers 106 that provided an "active" indicator in its OK message. There are several triggers that can be used to determine when server 108 sends a NOTIFY to device 102: once a predetermined number of responses has been received by interface server 108 from servers 106 (e.g. 1, 2, . . . all responses received); when a predetermined number of responses remain outstanding; or at periodic intervals.

Interface server 108 generates and sends device 102 NOTIFY messages that contain the status of registration/subscriptions of servers 106. As each "200 OK" message is received by device 102 from interface server 108, device 102 extracts the source server 106 information therefrom and uses that information to update its records regarding available servers. Device 102 may then begin to access the identified service or server 106 through interface server 108.

In FIG. 4 exemplary Notify message 11 generated by server 108 contains data relating to the servers 106 that have confirmed that they can provide services to device 102. These confirmations were received after the previous Notify message was sent by server 108, per message 7. Message 11 indicates that two active servers 106 are available to device 102: voice mail server 106b and presence server 106c. However, as an additional piece of information in message 11, a message waiting indicator (MWI) indicator is provided on behalf of voice mail server 106b. This indicates that voice mail server 106b has a recorded message for device 102. As such, when device 102 receives and decodes this message, device 102 can then request this recorded message (through interface server 106). If device 102 does not receive a notification request for a requested service (for instance MWI), device 102 may consider that the related service is inactive until an opposite state is confirmed to device 102 in a latter message.

If a server 106 has a change in its status that affects its services or availability, that server 106 may generate and send a message to interface server 108. Server 108, in turn, may send a message to device 102. When device 102 receives that message (or when it determines that an identified server 106 has had a change in status through other notifications or analysis), device 102 may send a RE-SUBSCRIBE request to interface server 108. The request may also contain information about servers with unchanged statuses.

If a server 106 terminates a service (e.g. Registration), it will send a NOTIFY request to the interface server 108 as a NOTIFY (regEvent, terminated) signal. When interface server 108 receives the NOTIFY, it generates provides a response to server 106 as a "200 OK" message. Also, interface server 108 propagates this status update to device 102, sending for example a NOTIFY with VoIP inactive message. Device 102 then responds with a "200 OK" message to interface server 108. If device 108 wishes to re-subscribe then a resubscription message exchange would be initiated.

Interface server 108 may have a local database containing configuration information for device 102 and servers 106. This database may be statically configured or may be based on execution of a program or database access.

Other conditions that dialogs will be generated using interface server 108 as an intermediary include a condition where a failure occurs at either device 102 and/or interface server 108. Each is discussed in turn.

If device 102 experiences an internal failure that affects its ability to use one of the requested or confirmed services, then device 102 generates and sends a message to interface server 108. Interface server 108 then updates its data relating to the status of device 102 and an analysis of subscribed services for device 102 against the revised capability information of device 102 is conducted to identify a set of servers 106 that are affected by this change in status. If a service should be terminated or changed, then a DE-REGISTER and/or UNSUBSCRIBE message is sent from interface server 108 to those servers 106.

If interface server 108 experiences an internal failure causing it to lose communications with either of device 102 and/or any servers 106, then interface server 108 may generate and send a message to either or both of device 102 and servers 106. This message may be a NOTIFY message to the device or DE-REGISTER or UNSUBSCRIBE towards the 106 servers.

It will be appreciated that other communication dialogs between device 102 and interface server 108 may be provided, including a forward function, where requests for services by device 102 are forwarded to another interface server 108 and a suspend function, where one or more selected services provided by servers 106 are suspended.

It will be appreciated that in one embodiment, the interface server may provide these functions through software, hardware and/or firmware operating on or with its microprocessor. The interface server has a communication connection to the servers in the network; and a second communication link to the electronic device. The interface server may have a device communication module that, through instructions provided to the microprocessor, receives the request from the device for access to one or more services or servers; and generates and sends a response to the request for access to the device. The interface server may also have a server communication module to analyze a status of at least one capability of the electronic device; generate and send a set of access requests to a set of servers of the one or more services or servers that it can access; monitor for responses from the servers; extract access information from said the responses; and process the access information for the response for the device. The interface server produces the set of access requests from an analysis of said status of at the capabilities of the electronic device.

Further detail is now provided on data and an algorithm that interface server 108 uses to analyze determined capabilities of device 102 against services provided by servers 106.

One notable piece of information in conducting this analysis is the status information of components of device 102. It will be appreciated that this status information device 102 may be communicated through various communication techniques, including messages that contain status flags and semaphores. One or more status flags (such as a "network XXX is accessible/not accessible" flag) can be embedded or attached to data communications sent between interface server 108 and device 102. As such, when a message, such as a SIP message, is sent from device 102 to interface server 108, an additional status flag may be attached to the message. Additionally, device 102 may periodically send a status message (e.g. networks XXX are accessible/not accessible) to interface server 108. Alternatively, interface server 108 may obtain other status information about other servers and devices in network 102 and make a determination of the capabilities of device 102.

Once a level of capability information of device 102 is provided, this information can be mapped against requirements or trigger conditions for requesting services from one or more servers 106. One embodiment utilizes a mapping of the identified capabilities of device 102 against the services of servers 106, such as provided in Table A:

TABLE A

| | Service/Server | | |
|---|---|---|---|
| Device 102 Capability | PBX 106a | Voice Mail 106b | Presence 106c |
| WiFi connection | needed | needed | needed |
| GRPS/EDGE Connection | not needed | needed | needed |
| BlackBerry Enterprise Connection | needed | needed | needed |
| Available Memory | 1 MB | 2 MB | 3 MB |
| Available Battery Power | 20% | 20% | 20% |

It will be appreciated that two or more capabilities may be considered to determine when a service is requested. The data in this table may be stored in a database and may be periodically updated.

Another matrix may track capabilities of device 102 that are not currently provided by device 102 as necessary condition(s) to request a particular service from servers 106, such as provided in Table B:

TABLE B

| Absent Device 102 Capability | Service | | |
|---|---|---|---|
| WiFi connection | PBX 106a | Voice Mail 106b | Presence 106c |
| GRPS/EDGE Connection | if no connection, then a connection to PBX 106a is needed | | |
| BlackBerry Enterprise Connection | if no connection, then a connection to PBX 106a is needed | if no connection, then a connection to voice mail 106b is needed | if no connection, then a connection to presence 106c is needed |

Again, it will be appreciated that two or more capabilities may be considered to determine when a service is requested.

Another matrix may track the services of servers 106 against the capabilities of device 102 to determine when a request a particular service from servers 106 is needed such as provided in Table C:

TABLE C

| | Device Capability | | |
|---|---|---|---|
| Service | WiFi connection | GRPS/EDGE connection | Enterprise connection |
| PBX 106a | not needed | not needed | not needed |
| Voice Mail 106b | needed | not needed | needed |
| Presence 106c | needed | needed | needed |

Again, it will be appreciated that two or more capabilities may be considered to determine when a service is requested.

Once an analysis of capability data for device 102 is complete, interface server 108 builds and sends individual messages to the identified servers 106. Interface server 108 has a series of modules to store the evaluation matrices, receive messages from device 102 and servers 106 and build and send messages to device 102 and servers 106.

Figure 5:
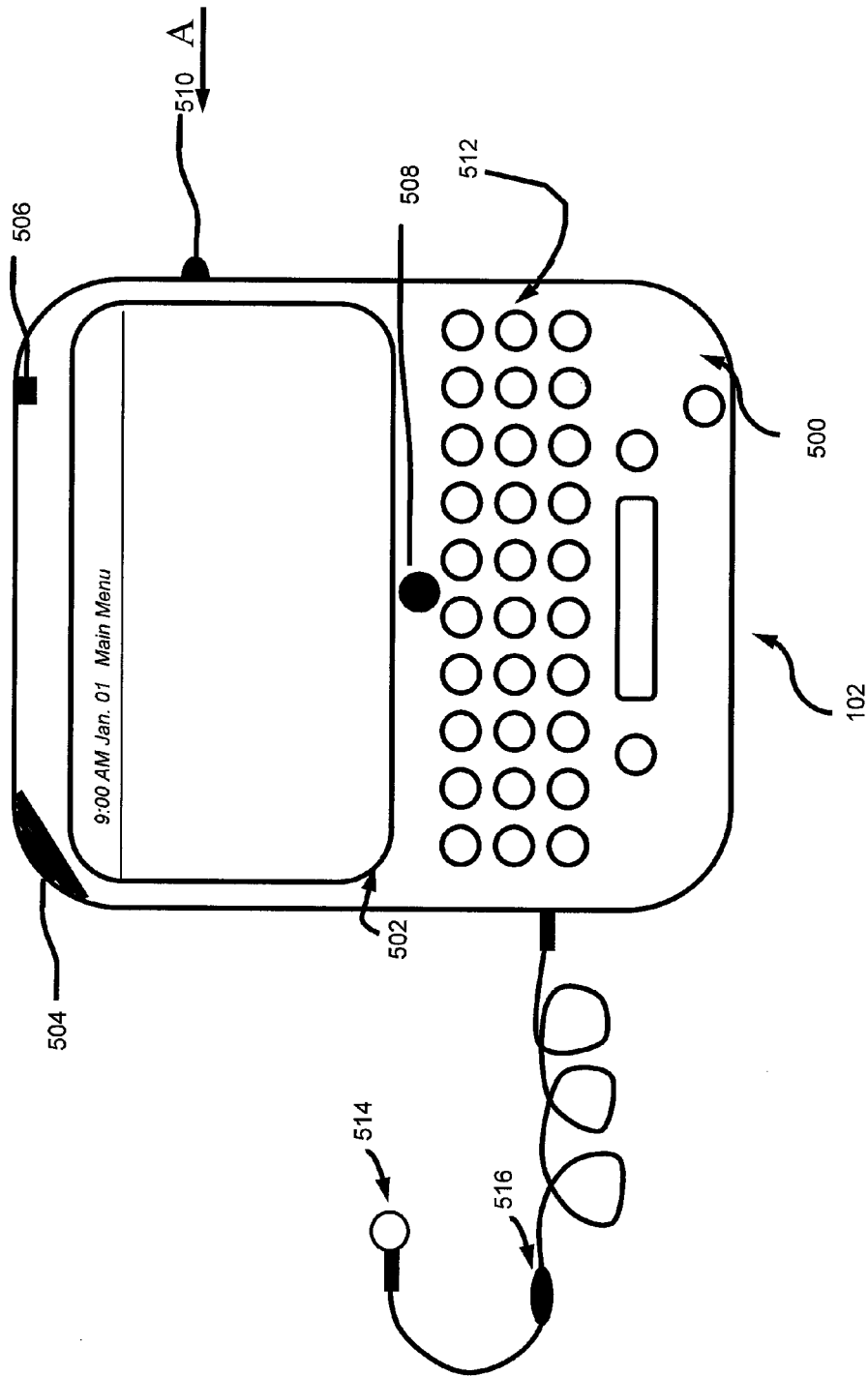
FIG. 5 is a schematic representation of the device of FIG. 1.

Further detail is now provided on components of device 102 that are related to processes relating to an embodiment. Referring to FIG. 5, electronic device 102 is based on a computing platform having functionality of an enhanced personal digital assistant with cellphone and e-mail features. It is, however, to be understood that electronic device 102 can be based on construction design and functionality of other electronic devices, such as smart telephones, desktop computers, pagers or laptops having telephony equipment. In a present embodiment, electronic device 102 includes a housing 500, an LCD 502, speaker 504, an LED indicator 506, trackball 508, an ESC ("escape") key 510, keypad 512, a telephone headset comprised of an ear bud 514 and a microphone 516. Trackball 508 and ESC key 510 can be inwardly depressed as a means to provide additional input to device 102. ESC key 510 may be depressed along the path of arrow "A".

It will be understood that housing 500 can be made from any suitable material as will occur to those of skill in the art and may be suitably formed to house and hold all components of device 102.

Device 102 is operable to conduct wireless telephone calls, using any known wireless phone system such as a Global System for Mobile Communications (GSM) system, Code Division Multiple Access (CDMA) system, CDMA 2000 system, Cellular Digital Packet Data (CDPD) system and Time Division Multiple Access (TDMA) system. Other wireless phone systems can include Bluetooth and the many forms of 802.11 wireless broadband, like 802.11a, 802.11b, 802.11g, etc. that support voice. Other embodiments include Voice over IP (VoIP) type streaming data communications that can simulate circuit-switched phone calls. Ear bud 514 can be used to listen to phone calls and other sound messages and microphone 516 can be used to speak into and input sound messages to device 102.

Figure 6:
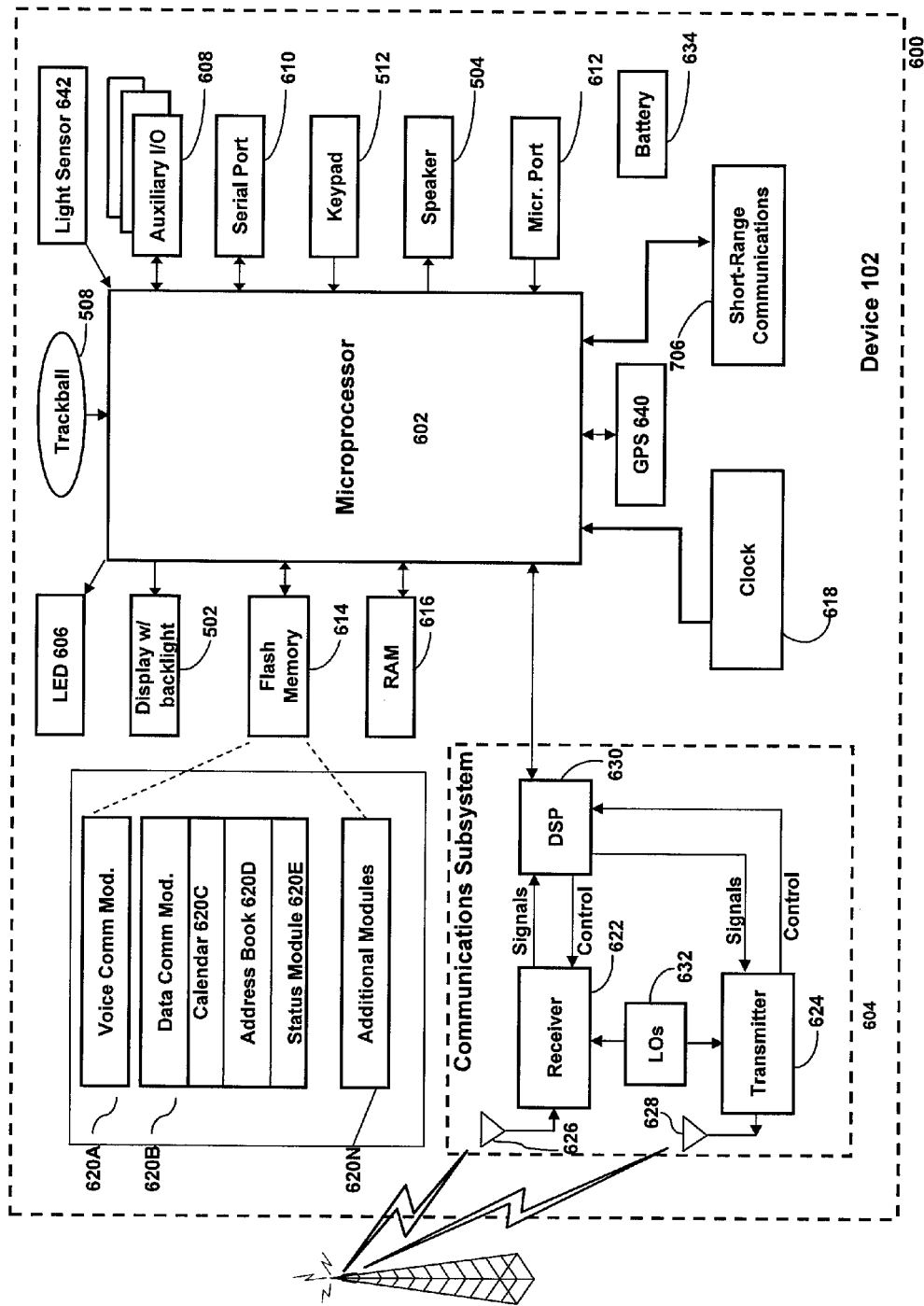
FIG. 6 is a block diagram of certain internal components of the device in FIG. 5.

Referring to FIG. 6, functional components of device 102 are provided in schematic 600. The functional components are generally electronic, structural or electro-mechanical devices. In particular, microprocessor 602 is provided to control and receive almost all data, transmissions, inputs and outputs related to device 102. Microprocessor 602 is shown schematically as coupled to keypad 512 and other internal devices. Microprocessor 602 preferably controls the overall operation of the device 102 and its components. Exemplary microprocessors for microprocessor 602 include microprocessors in the Data 950 (trademark) series, the 6200 series and the PXA900 series, all available at one time from Intel Corporation. Microprocessor 602 is connected to other elements in device 102 through a series of electrical connections to its various input and output pins. Microprocessor 602 has an IRQ input line which allows it to receive signals from various devices. Appropriate interrupt firmware is provided which receives and reacts to the signals detected on the IRQ line.

In addition to the microprocessor 602, other internal devices of the device 102 are shown schematically in FIG. 6 These include: display 502; speaker 504; keypad 512; communication sub-system 604; short-range communication sub-system 606; auxiliary I/O devices 608; serial port 610; microphone port 612 for microphone 516; flash memory 614 (which provides persistent storage of data including local data relating to the status flags used by an embodiment); random access memory (RAM) 616; clock 618 and other device sub-systems (not shown). Device 102 is preferably a two-way radio frequency (RF) communication device having voice and data communication capabilities. In addition, device 102 preferably has the capability to communicate with other computer systems via the Internet. Device 102 may have a SIM card (not shown).

Operating system software executed by the microprocessor 602 is preferably stored in a computer-readable medium, such as flash memory 614, but may be stored in other types of memory devices, such as read-only memory (ROM) or similar storage element. In addition, system software, specific device applications, or parts thereof, may be temporarily loaded into a volatile store, such as RAM 616. Communication signals received by the mobile device may also be stored to RAM 616.

Microprocessor 602, in addition to its operating system functions, enables execution of software applications on device 102. A set of software (or firmware) applications, generally identified as applications 620, that control basic device operations, such as voice communication module 620A and data communication module 620B, may be installed on the device 102 during manufacture or downloaded thereafter. Calendar application 620C and address book application 620D provide useful tracking tools for the user of device 102. Status module 620E monitors and evaluates the status of various capabilities of device 102 (e.g. its communication connections, battery power, available memory) and updates data stored on device 102 with this information. Module 620E may also generate and send communications to external devices (such as interface server 108) regarding this information on a periodic basis or as statuses change. As well, additional software modules, such as software module 620N, which may be for instance a personal information manager (PIM) application, may be installed during manufacture or downloaded thereafter into device 102. Data associated with each application can be stored in flash memory 614.

Data communication module 620B may comprise processes that implement features, processes and applications for device 102 as provided and described earlier, allowing device 102 to generate track status of various components of device 102 and to generate and send messages to external devices (such as interface server 108).

Communication functions, including data and voice communications, are performed through the communication sub-system 604 and the short-range communication sub-system 606. Collectively, sub-systems 604 and 606 provide the signal-level interface for all communication technologies processed by device 102. Various applications 620 provide the operational controls to further process and log the communications. Communication sub-system 604 includes receiver 622, transmitter 624 and one or more antennas, illustrated as receive antenna 726 and transmit antenna 728. In addition, communication sub-system 604 also includes processing modules, such as digital signal processor (DSP) 630 and local oscillators (LOs) 632. The specific design and implementation of communication sub-system 604 is dependent upon the communication network in which device 102 is intended to operate. For example, communication sub-system 604 of device 102 may operate with the Mobitex (trade-mark), DataTAC (trade-mark) or General Packet Radio Service (GPRS) mobile data communication networks and also operate with any of a variety of voice communication networks, such as Advanced Mobile Phone Service (AMPS), Time Division Multiple Access (TDMA), Code Division Multiple Access (CDMA), CDMA 2000, Personal Communication Service (PCS), Global System for Mobile Communication (GSM), etc. Other types of data and voice (telephonic) networks, both separate and integrated, may also be utilized with device 102. In any event, communication sub-system 604 provides device 102 with the capability of communicating with other devices using various communication technologies, including instant messaging (IM) systems, text messaging (TM) systems and short message service (SMS) systems.

In addition to processing communication signals, DSP 630 provides control of receiver 622 and transmitter 624. For example, gains applied to communication signals in receiver 622 and transmitter 624 may be adaptively controlled through automatic gain-control algorithms implemented in DSP 630.

Short-range communication sub-system 606 enables communication between device 104 and other proximate systems or devices, which need not necessarily be similar devices. For example, the short-range communication sub-system may include an infrared device and associated circuits and components, or a Bluetooth (trade-mark) communication module to provide for communication with similarly enabled systems.

Powering the entire electronics of the mobile handheld communication device is power source 634. In one embodiment, the power source 634 includes one or more batteries. In another embodiment, the power source 634 is a single battery pack, especially a rechargeable battery pack. A power switch (not shown) provides an "on/off" switch for device 102. A power source interface (not shown) may be provided in hardware, firmware, software or a combination of such elements to selectively control access of components in device 102 to power source 634. Upon activation of the power switch an application 620 is initiated to turn on device 102. Upon deactivation of the power switch, an application 620 is initiated to turn off device 102. Power to device 102 may also be controlled by other devices and by software applications 620. Other components in device 102 include GPS module 640 and light sensor 642.

The embodiments have been described for a system that provides an interface server to provide intermediary processing of communications between a device and servers in a network. It will be appreciated that embodiments may implement the features in any communication protocol or system. It will be appreciated that any features of interface server as described herein may be incorporated into a device or a component of another server in network 104.

It will be appreciated that the embodiments relating to devices, servers and systems may be implemented in a combination of electronic hardware, firmware and software. The firmware and software may be implemented as a series of processes and/or modules that provide the functionalities described herein. The algorithms and processes described herein may be executed in different order(s). Interrupt routines may be used. Data may be stored in volatile and non-volatile devices described herein and may be updated by the hardware, firmware and/or software. Other network embodiments may use non-client server architectures for management of communications.

The present disclosure is defined by the claims appended hereto, with the foregoing description being merely illustrative of embodiments of the present disclosure. Those of ordinary skill may envisage certain modifications to the foregoing embodiments which, although not explicitly discussed herein, do not depart from the scope of the present disclosure, as defined by the appended claims.

The invention claimed is:

1. A method for managing access to a server in a network for a wireless electronic device through an interface server in said network, said method comprising:
   after receiving at said interface server a request from said device for access to servers in said network, identifying a capability of said device and analyzing said capability with operating parameters of said or servers to identify a set of said servers that are compatible with said capability;
   sending access requests from said interface server to said set of said servers;
   monitoring for responses from said set of said servers to said access requests;
   generating and sending a response to said device providing information relating to said responses;
   receiving updated information regarding a current capability of said device;
   analyzing said updated information with operating parameters of said servers to identify a second set of said servers that are compatible with said updated information;
   generating and sending supplemental access requests to said second set of said servers;
   monitoring for second responses from said second set of said servers to said supplemental access requests; and
   generating and sending a supplemental response to said device providing information relating to said second responses from said second set of said servers.

2. The method for managing access to a server in a network as claimed in claim 1, wherein:
   said request from said device is provided in a session initiation protocol (SIP) message; and
   said response to said request is provided in another SIP message.

3. The method for managing access to a server in a network as claimed in claim 1, wherein said response aggregates said information relating to said responses from said set of servers.

4. The method for managing access to a server in a network as claimed in claim 1, wherein said capability of said device is identified by analyzing data in said request or other data.

5. The method for managing access to a server in a network as claimed in claim 1, wherein said device generates said request when said device enters said network.

6. The method for managing access to a server in a network as claimed in claim 2, wherein said analyzing said capability with operating parameters of said servers identifies a server that was not included in said request from said device.

7. The method for managing access to a server in a network as claimed in claim 1, wherein said updated information is provided from a message from said device.

8. The method for managing access to a server in a network as claimed in claim 1, wherein data relating to said operating parameters of said servers is provided to said interface server from a presence server in said network.

9. The method for managing access to a server in a network as claimed in claim 8, wherein said interface server provides network server information received from said presence server to said device.

10. The method for managing access to a server in a network as claimed in claim 1, wherein said capability is a voice communication capability and one of said servers is a voice mail server.

11. An interface server for managing access to a server in a network for an electronic device, said interface server comprising:
   a connection to servers in said network;
   a communication link to said device;
   a microprocessor;
   an analysis module providing instructions to said microprocessor
      to identify servers to associate with said device after analyzing a capability of said device with operating parameters of said servers; and
      to analyze updated information relating to said device with operating parameters of said servers to identify a second set of said servers that are compatible with said updated information; and
   a server communication module providing instructions to said microprocessor
      to receive a request from said device for access to one or more of said servers and extract any data relating to said capability of said device from said request;
      to send access requests to said servers for said device based on said request;
      to monitor for responses from said servers to said access requests;
      to generate and send a response to said device providing information relating to said responses from said servers;
      to receive said updated information regarding a current capability of said device;
      to generate and send a second set of access requests to said second set of said servers;
      to monitor for second responses from said second set of said servers to said second set of access requests; and
      to generate and send a second response to said device providing information relating to said second responses from said second set of said servers.

12. The interface server as claimed in claim 11, wherein data relating to said operating parameters of said servers is provided to said interface server from a presence server in said network.

13. The interface server as claimed in claim 12, wherein said interface server provides network server information received from said presence server to said device.

14. The interface server as claimed in claim 11, wherein:
   said request from said device is provided in a session initiation protocol (SIP) message; and
   said response to said request is provided in another SIP message.

15. The interface server as claimed in claim 11, wherein said response aggregates said information relating to said responses from said servers.

16. The interface server as claimed in claim 11, wherein when said analysis module analyzes said capability with operating parameters of said servers a server that was not included in said request from said device is identified.

17. The interface server as claimed in claim 11, said updated information is provided from a message from said device.

18. The interface server as claimed in claim 11, wherein data relating to said operating parameters of said servers is provided to said interface server from a presence server in said network.

19. The interface server as claimed in claim 18, wherein said interface server provides network server information received from said presence server to said device.

20. The interface server as claimed in claim 11, wherein said capability is a voice communication capability and one of said servers is a voice mail server.

* * * * *